G. C. PRINGLE.
SUPPORT FOR TURPENTINE CUPS.
APPLICATION FILED FEB. 9, 1910.

963,066.

Patented July 5, 1910.

Witnesses

Inventor
George C. Pringle,
By C. A. Snow & Co.
Attorneys

UNITED STATES PATENT OFFICE.

GEORGE C. PRINGLE, OF BILOXI, MISSISSIPPI.

SUPPORT FOR TURPENTINE-CUPS.

963,066.  Specification of Letters Patent.  Patented July 5, 1910.

Application filed February 9, 1910. Serial No. 542,939.

*To all whom it may concern:*

Be it known that I, GEORGE C. PRINGLE, a citizen of the United States, residing at Biloxi, in the county of Harrison and State of Mississippi, have invented a new and useful Support for Turpentine-Cups, of which the following is a specification.

This invention has reference to improvements in supports for turpentine cups and its object is to provide a support for the purpose which may be readily adjusted to the cup and at the same time may be so easily removed from the tree without the aid of tools that there is no danger of leaving the support in the tree so as to become harmful to the saws used by lumber men or mill men.

The present invention is designed more particularly for use in connection with a turpentine cup shown and described in my application No. 489,078 filed April 10, 1909, for improvements in turpentine cups. In the aforesaid application there is shown a cup of peculiar shape adapted to be held against the under side of a turpentine directing apron carried by the tree and upheld by a single support midway of the length of the cup in such manner that the cup is firmly locked in position against movement in any direction from accidental causes. In the means disclosed in the said application the support consists of an ordinary wire nail the head of which is made to engage in notches or grooves on the under face of the bottom of the cup thus locking the cup in position. Such nails are usually driven firmly into the tree and it commonly occurs that in the effort to withdraw the nails the heads are broken off and then to dispose of the nail the latter is simply driven into the tree to later become hurtful to the saws used in the mills to which the trees are taken to be cut up into lumber. By the time a tree is ready to be cut down for the purpose of being converted into lumber it may contain numerous nails which have from time to time been driven into the tree instead of being withdrawn therefrom.

In accordance with the present invention there is provided a support which may be readily driven into the tree in the same manner as a nail would be driven thereinto, but the support is so constructed as to be readily removable from the tree by the operator without the aid of tools of any kind whatsoever. At the same time the support may be adjusted to the turpentine cup and will hold the same against accidental displacement as firmly as will an ordinary nail.

Figure 1:
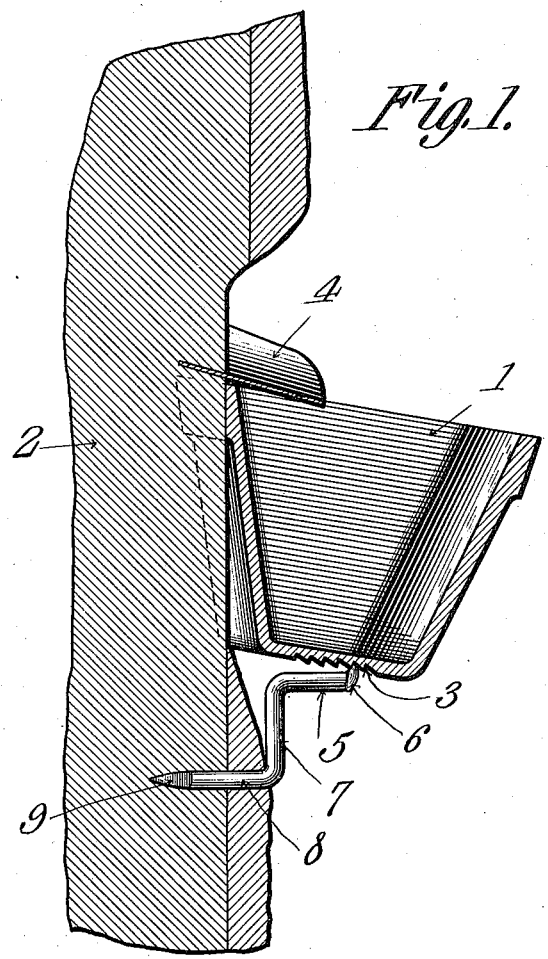
Figure 2:
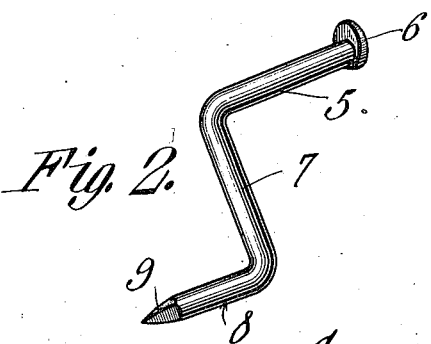

The invention will be best understood from a consideration of the following detail description taken in connection with the accompanying drawings forming a part of this specification, in which drawings, Figure 1 is a vertical section through a portion of a tree and of a turpentine cup in place thereon showing the support in position. Fig. 2 is a perspective view of the support.

Referring to the drawings there is shown a turpentine cup 1, which, as will appear from the aforesaid application, is of elongated form and curved longitudinally so as to partially embrace a tree, the latter being indicated at 2. The bottom of the cup is provided with a series of ridges 3 extending longitudinally of the cup and the individual ridges arranged successively farther and farther from the tree side of the cup.

A suitable apron 4 is provided for directing the exuded sap into the cup 1 and the upper edge of the tree side of the cup is designed to be locked against the under face of the apron 4.

In order to uphold the cup 1 there is provided a support 5 having a head 6 formed on one end, which head is adapted to engage one of the ridges 3 so as to lock the upper edge of the tree side of the cup 1 against the under side of the apron 4, the series of ridges making it possible to cause the very firm locking of the cup in position. The support 5 has its body portion bent first at an angle as indicated at 7, this portion 7 making an approximate right angle to the body portion 5 and then from the end of the portion 7 remote from its connection with the body portion 5 there is another angle extension 8 terminating in a point 9, the angle portion 8 extending at approximately right angles to the angle portion 7 but in a direction the reverse of that of the body portion 5 with relation to the portion 7. The length of the member 8 of the support is such that it may be driven into a tree to a sufficient extent to firmly hold the support against accidental displacement. The support may be driven into the tree by a suitable tool such as a hammer, the blows of which may be delivered at the connecting bend between the member 8 and the member 7, the body portion 5 presenting a means for holding the device in the hand while the blows are delivered to the other end of the angle extension 7.

When the support is driven into the tree the body portion 5 forms a somewhat elastic member to under-ride the cup and readily give to the movement of the cup toward the tree while being locked in place, but this elasticity is not sufficient to permit the cup to drop under any load of turpentine which may accumulate therein. Because of the peculiar shape of the support it can only be driven a certain distance into the tree and practice has demonstrated that this distance need not exceed about one and one-quarter inches.

To remove the support from the tree a suitable tool may be used, but this is not necessary, since because of the peculiar shape of the support it may be readily removed from the tree by hand without the aid of tools and so the liability of leaving the support in the tree is minimized, but even if left in the tree, there is no danger of the support becoming later a menace to the lumber or mill men since the support cannot be driven beyond a certain distance into the tree and is not only readily seen but may be very readily removed at any time. Furthermore the head end of the support is readily adjusted up or down while the support is still in the tree by tapping the head end with a hammer or other tool in the proper direction thus adapting the support to all shapes and sizes of trees and also to positions well down toward the root end of the tree. Furthermore the cup is much more readily removed from the tree or replaced thereon with the support herein described than is the case with an ordinary nail.

The support may be made of any suitable material of any cross section but it is found in practice that wire or rods of round cross section and appropriate gage, said wire or rods being of iron or steel, is particularly adapted for the purposes of the present invention.

What is claimed is—

1. A support for turpentine cups comprising a rod or length of wire formed at one end to engage locking means on the bottom of the cup and pointed at the other end, said support being bent at an angle to the cup engaging end and then at an angle to the first angle extension.

2. A support for turpentine cups comprising a rod or length of wire formed at one end to engage locking means on the bottom of the cup and pointed at the other end, said support being bent at an angle to the cup engaging end and then at an angle to the first angle extension, the two ends of the support extending in opposite directions from the intermediate portion.

3. A support for turpentine cups comprising a rod or length of wire formed at one end with a head to engage locking means on the bottom of the cup and pointed at the other end, said support being bent at an angle to the head end and then at an angle to the first named extension.

4. A support for turpentine cups comprising a rod or length of wire formed at one end with a head adapted to engage locking means on the bottom of the cup and pointed at the other end, said support being bent first at substantially right angles to the head end and then at substantially right angles to the first named angle extension, the two ends extending in opposite directions from the intermediate portion.

In testimony that I claim the foregoing as my own, I have hereto affixed my signature in the presence of two witnesses.

GEORGE C. PRINGLE.

Witnesses:
L. V. PRINGLE,
C. SANDUSKY.